United States Patent [19]

Auwerter

[11] 3,762,435
[45] Oct. 2, 1973

[54] PRESSURE REDUCING VALVE

[76] Inventor: Jay P. Auwerter, 18502 Syracuse Ave., Shaker Heights, Ohio 44110

[22] Filed: Apr. 12, 1972

[21] Appl. No.: 243,245

[52] U.S. Cl. ................ 137/505.22, 137/505.37
[51] Int. Cl. ................ F16k 31/38, F16k 31/363
[58] Field of Search ............... 137/505.22, 505.36, 137/505.37

[56] References Cited
UNITED STATES PATENTS
2,196,279  4/1940  Thomas ................. 137/505.22 X FOREIGN PATENTS OR APPLICATIONS
125,948  5/1959  U.S.S.R. .................. 137/505.22

Primary Examiner—William R. Cline
Attorney—James H. Tilberry et al.

[57] ABSTRACT

A steam loaded pressure reducing valve arrangement is disclosed which includes a main valve connected in a steam flow line and operable to reduce the pressure of steam from one value upstream of the valve to a lower value to be maintained downstream of the valve. The main valve is fluid pressure operated and includes first and second fluid pressure chambers on opposite sides of a diaphragm which is interconnected with a valve element to move the valve element between open and closed positions in response to diaphragm actuation. The first fluid chamber is interconnected with low pressure fluid from the downstream side of the valve, and the second fluid chamber is interconnected with fluid under pressure from the upstream side of the valve. A pressure controlling diaphragm loading valve is interconnected between the upstream side of the main valve and the second fluid chamber to reduce the pressure of the upstream fluid to a constant control pressure which is introduced into the second fluid chamber to bias the main valve toward the open position thereof. A condensate bleed orifice is provided between the loading valve and the first fluid pressure chamber, and an orifice is provided between the bleed orifice and the second fluid pressure chamber. The latter orifice provides for trapping fluid in the second chamber to provide a fluid cushion which prevents valve slamming, vibration, hunting and the like during closing movement thereof, and the bleed orifice serves to bleed condensate from the area ahead of the second chamber to assure that cushioning can be achieved.

10 Claims, 1 Drawing Figure

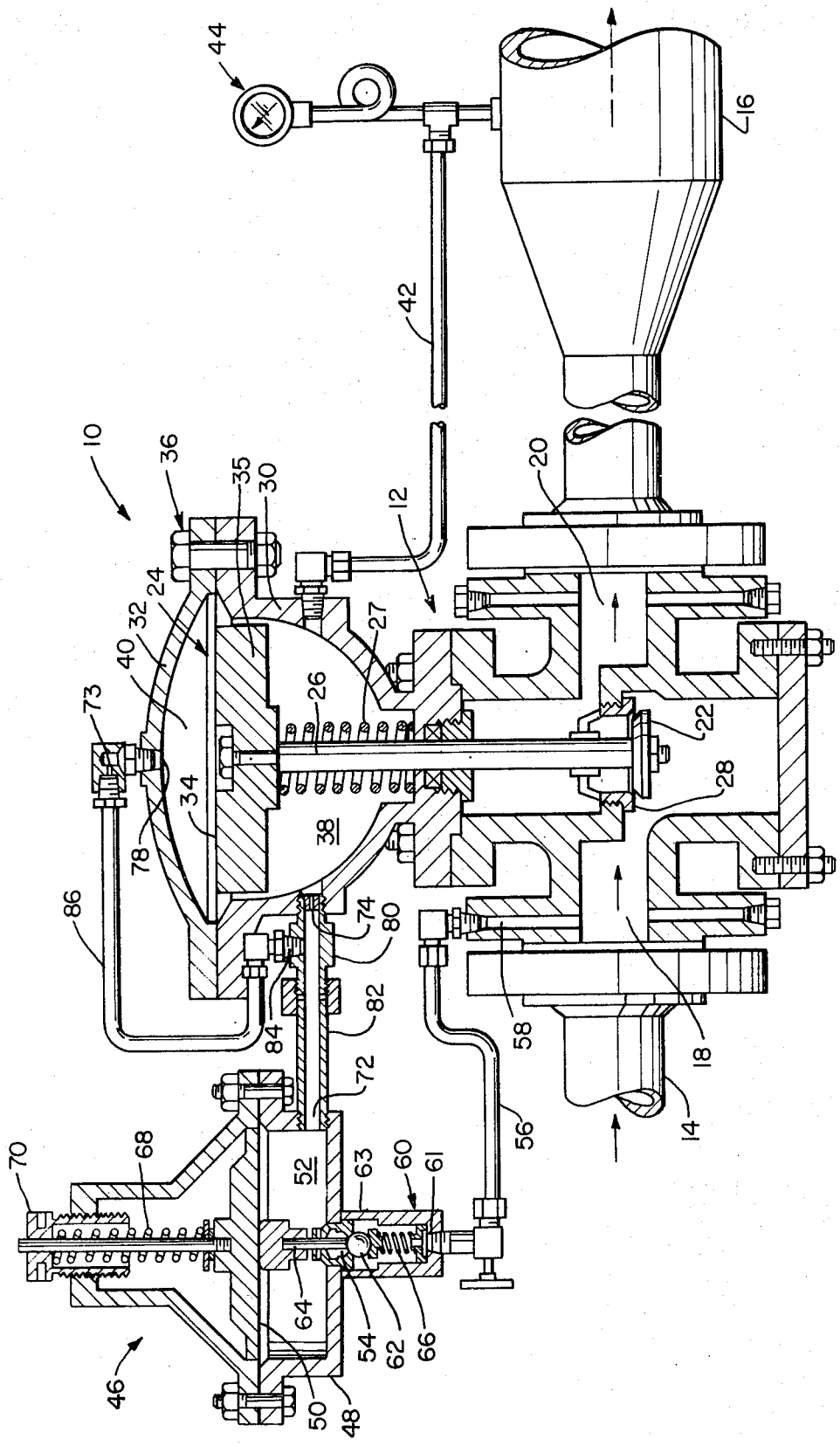

PRESSURE REDUCING VALVE

This invention relates to the art of fluid flow control and, more particularly, to a valve arrangement for reducing the pressure of fluid from one level upstream of the valve arrangement to a lower level downstream thereof.

Pressure reducing valve arrangements have been provided heretofore for the purpose of reducing the pressure of fluid such as steam flowing in a line to a desired lower level which is to be maintained. Generally, such arrangements include a normally closed main valve disposed in the flow line and controlled by a pilot valve in a manner whereby the main valve is opened in response to a drop in downstream pressure below the level to be maintained and is closed to flow therethrough when the downstream pressure is at the desired level. Further, the main valve is often a fluid pressure actuated valve having a control fluid such as air supplied thereto through the pilot valve. The pilot valve is actuated in response to a pressure signal to control delivery of the control fluid to the main valve to actuate the latter in response to the condition indicated by the pressure signal.

It will be appreciated that a considerable difference in pressure exists on opposite sides of the main valve in arrangements of the above character. When closure movement of the valve element is in the direction of flow, the high pressure against the upstream side of the valve head or valve element causes the latter to close or slam against its seat with considerable force which results in undesirable noise and, more importantly, in excessive wear and possible damage to the valve element. Moreover, valves of the above character are repeatedly operated or modulated between the open and closed positions thereof, whereby the life of the valve element is reduced considerably as a result of such closing impact between the valve head and its seat. Still further, pilot operation of such valves results in undesirable hunting of the valve due to a lag between the pressure signal to the pilot and pilot actuation of the valve and, in steam flow control, due to thermodynamic instability in the control portion of the valve caused by a temperature difference between the valve casing and control fluid. Accordingly, it becomes most desirable to provide for flow control system of this character to be controlled by system fluid rather than by fluid from an independent source, thus to achieve a reduction in components required, thermal stability in the system, and a reduction in maintenance problems and cost, and the like. Moreover, control by system fluid advantageously provides for the valve system to be employed when a separate control fluid source is not available.

In accordance with the present invention in its broadest aspects, a fluid flow control arrangement is provided in which opening and closing movements of a pressure reducing main valve in a fluid flow line is controlled by a constant pressure fluid signal the level of which is controlled directly by system fluid under pressure and without a pilot valve or relay of the character heretofore employed. According to another aspect of the invention, the arrangement provides for closing movement of the main valve to be cushioned to avoid the foregoing disadvantages resulting from valve slamming in previous pressure reducing valve arrangements. More particularly, in accordance with the present invention, the system fluid may be a liquid or a gaseous fluid transformable to a liquid state, such as steam, whereby at least a portion of the fluid withdrawn from the flow line for control purposes may be in or transformed to a liquid state in which the liquid is, of course, incompressible. The arrangement according to the present invention is particularly suited to controlling the main valve in a flow line by employing the system fluid as the control fluid. However, the control fluid may be air, water, steam or other fluid supplied from a separate source in which case the system fluid is employed to control the pressure of the control fluid so that the pressure thereof for main valve control purposes is maintained constant.

In accordance with a further aspect of the present invention a fluid actuated main valve is provided having a pair of opposed fluid chambers separated by a diaphragm which is interconnected with the main valve element in a manner whereby flexure of the diaphragm results in opening and closing movements of the valve element. One of the fluid chambers is connected for flow of fluid thereinto from the low pressure downstream side of the main valve, and the other of the chambers is a diaphragm loading chamber connected to receive control fluid at a constant pressure. Pressure controlling valve means is interconnected between the upstream side of the main valve element and either the diaphragm loading chamber to reduce the pressure of upstream fluid to a desired constant loading pressure or to a separate control fluid source so as to control the pressure of the latter control fluid. Maintenance of the control fluid at a constant loading pressure is of particular importance in that changes in pressure are accompanied by changes in temperature, and if the thermodynamic conditions in the control portion of the arrangement are not maintained generally constant response of the control section to an increase or decrease in downstream pressure is not uniform, whereby the main valve hunts. This, of course, is an undesirable characteristic which is advantageously overcome in accordance with the present invention in that by maintaining a constant control fluid pressure the thermodynamic characteristics in the control section are stabilized.

The control fluid pressure is maintained at a level such that when the downstream pressure is at the desired level, the biasing forces on opposite sides of the diaphragm are balanced whereby the valve element remains closed. A pressure drop on the downstream side of the main valve results in a pressure drop in the fluid chamber associated therewith, whereby the constant control pressure in the loading chamber causes the valve element to move toward its open position to permit flow between the high pressure and low pressure sides of the main valve. When the downstream pressure increases to the desired level the pressure in the corresponding chamber increases and when it equals the loading pressure the valve is moved to the closed position thereof.

As mentioned hereinabove, the system fluid is either a liquid or a gaseous fluid transformable to liquid state. In either event, at least a portion of the fluid in the control fluid pressure controlling portion of the system is in a liquid state and is trapped ahead of the pressure controlling valve. Liquid bleed means is provided for the purpose of preventing the existence of an incompressible liquid condition in the control portion, whereby the pressure controlling valve remains operable even if the control section is completely filled with liquid. In the preferred embodiment in which the control fluid is system fluid, the fluid in the diaphragm loading chamber is trapped therein by means of flow restriction means associated therewith. This trapped fluid serves as a cushion to reduce impact forces between the main valve and its seat when the main valve closes. Such fluid, if in liquid state the of course, incompressible liquid and, in accordance with the present invention the bleed means provides for bleeding any condensate between the pressure controlling valve and loading chamber portion of the system in a manner whereby the desired cushioning action is assured.

In accordance with a narrower aspect of the present invention, bleeding of the control fluid is achieved by providing flow restriction or orifice means between the pressure controlling valve and the diaphragm loading chamber. The orifice means opens from line means between the latter valve and loading chamber into the fluid chamber associated with the downstream side of the main valve. Thus, if the control fluid pressure is equal to the pressure to be maintained downstream, a balanced condition exists across the flow restriction means when the valve element is closed. If the control pressure is slightly higher than the pressure to be maintained downstream of the main valve, then a constant bleeding of condensate from the area between the pressure controlling or loading valve and loading chamber is achieved while the main valve is closed. Upon a reduction in downstream pressure calling for opening of the main valve, a pressure drop exists across the orifice means, whereby condensate can bleed into the downstream fluid chamber. When the downstream pressure reaches the desired level causing the main valve element to move toward its closed position, the restriction or orifice means assures bleeding of condensate if necessary to avoid a non-compressible fluid condition and assure that closure of the valve element is buffered or cushioned by the condensate trapped in the loading chamber.

Accordingly, it is an outstanding object of the present invention to provide a fluid flow control arrangement for reducing the pressure of fluid flow in a line from a high pressure upstream of a main valve to a lower pressure downstream of the valve in a manner which advantageously employs system fluid to control the pressure of control fluid for the main valve.

Another object is the provision of a flow control arrangement of the above character which provides for reducing the impact force between the main valve element and its seat in response to closure of the main valve.

Another object of the present invention is the provision of a flow control arrangement of the above character wherein the valve element is moved towards its open position by control fluid under pressure from the system, which control fluid is maintained at a constant pressure and provides a cushion against impact between the valve element and seat upon closure of the main valve.

Yet another object of the present invention is the provision of a flow control arrangement of the above character wherein the control fluid under pressure for the main valve is derived from high pressure upstream fluid and is operable to load a diaphragm component of the main valve actuating means at a constant pressure and in a manner whereby a portion of the fluid operates to cushion closing movement of the valve.

Still another object is the provision of a pressure reducing valve control arrangement of the above character wherein the fluid flow is steam and the control fluid under pressure includes condensate, and wherein means is provided for disposal of a portion of such condensate to assure that valve cushioning is achieved.

The foregoing objects and advantages of the present invention will in part be obvious and in part more fully pointed out hereinafter in conjunction with the description of the drawing which illustrates a preferred embodiment of the present invention.

With reference now to the drawing in greater detail wherein the showings are for the purpose of illustrating a preferred embodiment of the invention only and not for the purpose of limiting the same, a steam loaded pressure reducing valve arrangement 10 is illustrated comprising a main or first valve means 12 interposed in a steam flow line defined by an upstream, high pressure line portion 14 and a downstream, low pressure line 16. Valve means 12 includes an inlet 18 suitably connected to upstream line portion 14 and an outlet 20 suitably connected to downstream line portion 16. Valve means 12 further includes fluid flow control means comprised of valve element 22, diaphragm means 24 and stem means 26 which suitably interconnects valve element 22 and diaphragm means 24. Valve element 22 is adapted to be moved between first and second positions relative to valve seat means 28 to close and open valve means 12 for flow of fluid from line portion 14 to line portion 16. It will be appreciated, of course, that movement is imparted to valve element means 22 in response to deflection of diaphragm means 24. More particularly, in the particular embodiment disclosed, valve means 12 includes an upper housing portion 30 and separable cover portion 32 between the peripheral edges of which a diaphragm element 34 is clamped such as by nut and bolt means 36. Diaphragm component 34 divides the upper housing portion and cover into a pair of fluid pressure chambers 38 and 40. Fluid pressure chamber 38 is adapted to receive fluid under pressure from downstream line portion 16 and, in this respect, is connected to downstream line portion 16 such as by conduit means 42. Thus, chamber 38 is adapted to be filled with fluid under pressure corresponding to the pressure to be maintainted in the downstream portion of the line, and such pressure biases valve element 22 toward the seated position thereof. A coil spring 27 is disposed between housing 30 and diaphragm means 24. Spring 27 serves to balance the opening bias exerted on the valve by diaphragm block 35, and does not function to exert a closing force on the valve in addition to that of the fluid pressure in chamber 38. Pressure gauge means 44 may be associated with conduit means 42 to provide an indication of the downstream pressure.

Fluid pressure chamber 40 is a diaphragm loading chamber and is adapted to receive fluid under pressure from upstream line portion 14, and means is provided to control the pressure of fluid delivered to chamber 40. In the particular embodiment illustrated, the control means includes diaphragm loading valve means 46 comprised of housing and diaphragm means including housing means 48 and diaphragm means 50 which together define a fluid pressure chamber 52. Housing means 48 includes an inlet opening 54 through which fluid from line portion 14 upstream of valve element 22 is adapted to be introduced into chamber 52. In this respect, inlet opening 54 is interconnected with high pressure upstream fluid flow through conduit means 56 and ball valve means 60. Conduit means 56 has one end thereof connected with passageway means 58 provided in valve means 12 upstream of valve element 22, and the other end of conduit means 56 is connected to inlet means 61 of ball valve means 60. A ball valve element 62 is disposed in housing means 63 of valve means 60 and is provided with steam means 64 suitably interconnected with diaphragm element 50 so that deflection of the diaphragm imparts reciprocating movement to the ball valve to open and close inlet opening 54. The loading valve housing means 48 is further provided with an outlet 72 through which fluid under pressure from chamber 52 is adapted to be delivered to diaphragm loading chamber 40 of valve means 12 through lines 82 and 86 and an interposed fitting 80, the purpose and function of which is set forth more fully hereinafter.

Ball valve 62 is biased to close opening 54 primarily by means of fluid pressure in chamber 52, lines 82 and 86 and loading chamber 40, which fluid pressure defines a control pressure. The pressure of upstream fluid acting against the ball valve and the bias of a spring component 66 disposed in ball valve housing 63 exert a negligible closing bias on the ball valve. The closing bias against ball valve 62 is opposed by spring means 68 disposed behind diaphragm 50. The biasing force afforded by spring means 68 is adapted to be adjusted and, in this respect, the outer end of spring means 68 is associated with suitable adjusting nut means 70. Preferably, the control pressure of fluid in chamber 52, lines 82 and 86 and chamber 40 is maintained substantially equal to the desired downstream pressure to be maintained. Thus, it will be appreciated that spring means 68 will be adjusted so that the force thereof will overcome the biasing force tending to close ball valve 62 when the control pressure drops below the desired level. When the control pressure drops ball valve 62 is displaced to open inlet 54, whereby high pressure fluid from upstream line portion 14 enters chamber 52 to increase the control pressure to the desired level. While it is most desirable to maintain the control pressure approximately equal to the downstream pressure to be maintained, it will be appreciated that the control pressure may be adjusted to be higher than the downstream pressure and, for example, may be 1 to 2 psi above the downstream pressure.

In operating the system as thus far described to control the flow of steam across valve means 12, the system fluid in diaphragm loading chamber 40 will be condensate, and the system fluid in chamber 52 of the loading valve and lines 82 and 86 will, at any given time, be in the form of condensate or a combination of steam and condensate. More particularly, condensate fills diaphragm chamber 40 and is trapped therein in a manner whereby the condensate cushions closing movement of the main valve to reduce impact forces between valve element 22 and its seat and to reduce vibration or hunting of the valve during operation thereof. In this respect, orifice means 73 is provided between line 86 and inlet opening 78 of chamber 40. Opening of valve means 12 results in an increase in the volume of chamber 40, whereby fluid in line 86 flows through orifice means 73 and into chamber 40. When valve 12 closes the area of chamber 40 decreases and excess fluid therein flows back through orifice means 73. Such flow, however, is restricted by the orifice means with the result that closing movement of valve element 22 is cushioned.

Under certain circumstances, the area defined by loading valve chamber 52 and lines 82 and 86 may be completely filled with condensate. Since the condensate is an incompressible liquid it will be appreciated that such a flooded condition would inhibit diaphragm operation. In accordance with the present invention such a condition of incompressibility is advantageously avoided. In this respect, means is interposed between loading valve chamber 52 and downstream pressure diaphragm chamber 38 to bleed condensate to chamber 38 so that the cushioning effect can be achieved under all conditions which might occur with regard to the state of the control fluid in the area between loading valve chamber 52 and lines 82 and 86. More particularly, in the embodiment illustrated, the means to bleed condensate is defined by orifice or flow restriction means 74. Orifice or restriction means 74 is disposed in a T-coupling 80 having an inlet end interconnected with pilot valve outlet opening 72 by line 82, an outlet opening 84 interconnected with fluid chamber 40 by line 86, and a second outlet opening which is defined by orifice or restriction means 74. Orifice or restriction means 74 defines a bleed passageway through which condensate is adapted to bleed, and T-coupling 80 is associated with housing portion 30 of valve means 12 in a manner whereby condensate flow through the orifice or restriction means is introduced into fluid chamber means 38 associated with downstream line portion 16. It will be appreciated that while it is preferred to employ restriction 73 in the system, the cushioning effect provided thereby could be achieved by orifice 74 alone.

The operation of orifice means 74 in conjunction with that of the pressure reducing valve system is as follows. Pressure in upstream line portion 14 is at a given level, and pressure in downstream line portion 16 is to be maintained at a given pressure reduced from the upstream pressure. Accordingly, fluid at the downstream pressure fills fluid chamber 38 of valve means 12 biasing diaphragm means 34 upwardly to close valve element 22 against seat 28, whereby flow from upstream line portion 14 to downstream line portion 16 is blocked or closed. Assuming the control fluid pressure to be at the proper level and loading chamber 40 to be filled with condensate, the fluid pressure on opposite sides of orifice or restriction means 74 and the fluid pressure on opposite sides of diaphragm element 34 is equal, whereby valve element 22 is maintained closed against seat means 28. Valve means 12 is actuated and modulated between open and closed conditions in accordance with downstream demand. Accordingly, when the pressure falls below the desired level to be maintained, there is a pressure drop in fluid chamber 38, whereby control fluid pressure in fluid chamber 40 then exceeds the pressure in chamber 38 and exerts a force against diaphragm element 34 which displaces the latter downwardly to move valve element 22 from seat 28 to open valve means 12 for fluid flow from upstream line portion 14 to downstream line portion 16. The pressure drop in fluid chamber 38 causes a pressure drop to exist across orifice or restriction means 74 whereby control fluid can bleed through orifice or restriction means 74 and into fluid chamber 38. Downward displacement of diaphragm element 34 causes an increase in the volume of fluid chamber 40, whereby control fluid flows through restriction means 73 into chamber 40. The expansion of chamber 40 does not alone result in a pressure drop in the control fluid sufficient to cause opening of the loading valve. The chamber expansion together with condensate bleeding, however, may cause a sufficient drop in control fluid pressure. If so, loading valve means 46 responds immediately to such reduction in pressure and, in this respect, spring means 68 causes ball element 62 to be displaced from its seat whereby fluid under pressure from upstream line portion 14 enters chamber 52 to increase the control pressure to the desired level. Pilot valve means 46 will, of course, operate at all times as is necessary to maintain the control pressure at the desired level. As the pressure in downstream line portion 16 increases toward the level to be maintained, the pressure increases in fluid chamber 38, whereby diaphragm element 34 is displaced upwardly to move valve element means 22 towards its closed position. The diaphragm movement in response to the increase in pressure in fluid chamber 38 results in a decrease in the volume of loading chamber 40, whereby control fluid therein is forced back through restriction means 73. Because of the restricted flow through orifice means 73, a fluid cushion exists in chamber 40, whereby valve element 22 is restrained from closing against seat 28 with a high impact force. Regardless of whether chamber 40 alone is filled with condensate or whether condensate also fills or partially fills the area between loading valve chamber 52 and chamber 40, the bleeding of fluid into fluid chamber 38 through orifice means 74 desirably provides for the necessary flow of control fluid to assure that the cushioning effect is achieved. Main valve means 12 will, of course, be modulated between closed and full open positions thereof in response to pressure conditions in downstream line portion 16, and it will be appreciated that repeated slight opening and closing movements of valve element 22 when the downstream pressure varies continuously but only slightly relative to the pressure to be maintained will advantageously be buffered as a result of the bleeding means, thus to reduce the noise of operation of the valve and, more importantly, to reduce the wear of the valve element which would otherwise result from repeated engagement therewith with its valve seat under high impact forces resulting from sudden closing movements imparted thereto by the high pressure upstream fluid acting on the large area upstream face of the valve element. Still further, the cushioning effect reduces vibration and hunting movements of the valve during operation thereof.

While the restriction or orifice means 73 and 74 have been illustrated as being fixed orifice devices, it will be appreciated that adjustable or variable orifice devices could be employed. Further, while it is advantageous to bleed the control fluid into chamber 38, it will be appreciated that the control fluid could be bled other than to fluid chamber 38 and, for example, could be bled directly into downstream line portion 16. Still further, it will be appreciated that the control fluid bleed orifice could be provided in diaphragm means 24 so as to interconnect chambers 40 and 38. Such an arrangement would result in maintaining a substantially flooded condensate condition in loading valve chamber 52, lines 82 and 86 and diaphragm loading chamber 40.

While the preferred embodiment has been described in conjunction with controlling the flow of steam, it will be appreciated that the principles of the present invention are applicable to controlling the flow of any liquid or any fluid having gaseous and incompressible liquid states. Moreover, while considerable advantage is realized by employing the system fluid as the diaphragm loading control fluid, it will be appreciated that the system fluid can be used to advantage to control the pressure of a separately supplied diaphragm loading fluid, in which case the system fluid becomes a control fluid under pressure between the loading valve and such a separate source of diaphragm loading fluid to control the pressure of the latter so that diaphragm loading is at a desired constant pressure. Bleed off of system control fluid, such as into the low pressure downstream chamber of the main valve, assures maintaining the system control fluid at a constant pressure so that the diaphragm loading is at a constant pressure.

As many possible changes may be made in the present invention and as many possible changes may be made in the embodiment herein described, it is to be distinctly understood that the foregoing description is to be interpreted merely as illustrative of the present invention and not as a limitation.

Having thus described my invention, I claim

1. A fluid flow control arrangement including first valve means adapted to be interposed in a fluid flow line and operated to reduce the pressure of fluid from one value upstream of said first valve means to a lower value to be maintained downstream of said first valve means, said first valve means including a single valve element and seat means therefor, said valve element engaging said seat in the direction of fluid flow through said flow line, said first valve means further including fluid pressure responsive flow control means movable between first and second positions to respectively close and open said first valve means for flow of fluid therethrough, means for interconnecting said flow control means with fluid under pressure from said line downstream of said first valve means for said downstream fluid to bias said flow control means toward said first position thereof, means to deliver control fluid under pressure to said flow control means for biasing said flow control means toward said second position thereof, said means to deliver fluid under pressure including fluid pressure control means interconnected with said line upstream of said first valve means and operable to control the pressure of said control fluid, said means to deliver control fluid under pressure including fixed orifice means to bleed control fluid from between said fluid pressure control means and said flow control means to provide for said control fluid to cushion movement of said flow control means from said second position toward said first position thereof.

2. The fluid flow control arrangement of claim 1, wherein said orifice means opens between said fluid pressure control means and the downstream side of said first valve means.

3. The fluid flow control arrangement of claim 2, wherein said means operable to provide for said control fluid to cushion movement of said flow control means further includes flow restriction means between said orifice means and said flow control means.

4. A fluid flow control arrangement including first valve means adapted to be interposed in a fluid flow line and operated to reduce the pressure of fluid from one value upstream of said first valve means to a lower value to be maintained downstream of said first valve means, said first valve means comprising fluid pressure responsive flow control means including diaphragm means and a single flow control element connected therewith for movement between first and second positions relative to a seat for said element to respectively close and open said first valve means for flow of fluid therethrough, said flow control element engaging said seat in the direction of fluid flow through said flow line, first fluid chamber means on one side of said diaphragm means, first means interconnecting said first chamber means with fluid under pressure from said line downstream of said first valve means for said downstream fluid to bias said diaphragm means for said flow control element to close said first valve means, second fluid chamber means on the other side of said diaphragm means, second means interconnecting said second chamber means with fluid under pressure from said line upstream of said first valve means to provide a control fluid under constant pressure to bias said diaphragm means for said flow control element to open said first valve means said second interconnecting means including control fluid flow control means operable to provide for said control fluid to cushion movement of said flow control element from said second position toward said first position thereof, and said control fluid flow control means including fixed orifice means for bleeding control fluid from between said line upstream and the downstream side of said first valve means.

5. The fluid flow control arrangement of claim 4, wherein said control fluid flow control means further includes flow restriction means between said bleed means and said second chamber.

6. The fluid control arrangement of claim 4, wherein said second interconnecting means includes second valve means for reducing said upstream fluid pressure, said second valve means having an inlet for fluid from said line upstream of said first valve means and an outlet, means interconnecting said outlet with said second chamber means, and said fixed orifice means being between said outlet and said second chamber means.

7. The fluid flow control arrangement of claim 6, and flow restriction means between said orifice means and said second chamber means.

8. The fluid flow control arrangement of claim 7, wherein said orifice means opens to the downstream side of said first valve means.

9. A fluid flow control arrangement including first valve means adapted to be interposed in a fluid flow line and operated to reduce the pressure of fluid from one value upstream of said first valve means to a lower value to be maintained downstream of said first valve means, said first valve means comprising fluid pressure responsive flow control means including diaphragm means and flow control element means movable between first and second positions to respectively close and open said first valve means for flow of fluid therethrough, first fluid chamber means on one side of said diaphragm means, first means interconnecting said first chamber means with fluid under pressure from said line downstream of said first valve means for said downstream fluid to bias said diaphragm means for said flow control element means to close said first valve means, second fluid chamber means on the other side of said diaphragm means, second means interconnecting said second chamber means with fluid under pressure from said line upstream of said first valve means to provide a control fluid under constant pressure to bias said diaphragm means for said flow control element means to open said first valve means said second interconnecting means including control fluid flow control means operable to provide for said control fluid to cushion movement of said flow control element means from said second position toward said first position thereof, said control fluid flow control means including means for bleeding control fluid from between said line upstream and the downstream side of said first valve means, said control fluid flow means further including flow restriction means between said bleed means and said second chamber, and said bleed means opening into said first chamber means.

10. A fluid flow control arrangement including first valve means adapted to be interposed in a fluid flow line and operated to reduce the pressure of fluid from one value upstream of said first valve means to a lower value to be maintained downstream of said first valve means, said first valve means comprising fluid pressure responsive flow control means including diaphragm means and flow control element means movable between first and second positions to respectively close and open said first valve means for flow of fluid therethrough, first fluid chamber means on one side of said diaphragm means, first means interconnecting said first chamber means with fluid under pressure from said line downstream of said first valve means for said downstream fluid to bias said diaphragm means for said flow control element means to close said first valve means, second fluid chamber means on the other side of said diaphragm means, second means interconnecting said second chamber means with fluid under pressure from said line upstream of said first valve means to provide a control fluid under constant pressure to bias said diaphragm means for said flow control element means to open said first valve means, said second interconnecting means including second valve means for reducing said upstream fluid pressure, said second valve means having an inlet for fluid from said line upstream of said first valve means and an outlet, means interconnecting said outlet with said second chamber means, control fluid bleed means between said outlet and said second chamber means and opening to the downstream side of said first valve means, and flow restriction means between said bleed means and said second chamber means, said bleed means opening into said first chamber means.

* * * * *